United States Patent [19]

Dreyer

[11] Patent Number: 5,488,728

[45] Date of Patent: Jan. 30, 1996

[54] MICROPROCESSOR HAVING A RUN/STOP PIN FOR ACCESSING AN IDLE MODE

[75] Inventor: Robert S. Dreyer, Sunnyvale, Calif.

[73] Assignee: Intel Corporation, Santa Clara, Calif.

[21] Appl. No.: 332,373

[22] Filed: Oct. 31, 1994

Related U.S. Application Data

[63] Continuation of Ser. No. 101,783, Aug. 3, 1993, abandoned, which is a continuation of Ser. No. 874,716, Apr. 27, 1992, abandoned.

[51] Int. Cl.$^6$ ................................................. G06F 15/46
[52] U.S. Cl. ........................ 395/726; 395/300; 395/500
[58] Field of Search ................................. 395/325, 500, 395/550, 575, 725, 800, 300, 726–742

[56] References Cited

U.S. PATENT DOCUMENTS

| | | | |
|---|---|---|---|
| 4,010,448 | 3/1977 | Bennett et al. | 340/172.5 |
| 4,403,287 | 9/1983 | Blahut et al. | 364/200 |
| 4,547,849 | 10/1985 | Louie et al. | 364/200 |
| 4,896,289 | 1/1990 | Svinicki et al. | 364/900 |
| 4,914,325 | 4/1990 | Yamada | 307/592 |
| 4,945,536 | 7/1990 | Hancu | 371/22.3 |
| 4,949,360 | 8/1990 | Martin | 375/106 |
| 4,967,326 | 10/1990 | May | 364/220 |
| 5,032,983 | 7/1991 | Fu et al. | 364/200 |
| 5,036,453 | 7/1991 | Renner et al. | 364/200 |
| 5,056,015 | 10/1991 | Baldwin et al. | 364/200 |
| 5,070,476 | 12/1991 | Fujiwara | 395/575 |
| 5,124,910 | 6/1992 | Koumoto et al. | 395/375 |
| 5,125,088 | 6/1992 | Culley | 395/500 |
| 5,128,970 | 7/1992 | Murphy | 375/106 |
| 5,218,525 | 6/1993 | Amasaki et al. | 364/140 |
| 5,222,068 | 6/1993 | Burchard | 371/22.3 |
| 5,254,942 | 10/1993 | D'Souza | 324/158 |
| 5,276,824 | 1/1994 | Skruhak et al. | 395/375 |
| 5,281,664 | 1/1994 | Hahn et al. | 307/272.2 |
| 5,329,471 | 7/1994 | Swoboda et al. | 364/578 |
| 5,353,424 | 10/1994 | Partovi et al. | 395/425 |

FOREIGN PATENT DOCUMENTS

| | | | |
|---|---|---|---|
| 1580846 | 6/1977 | European Pat. Off. | G06F 11/30 |
| 0313848 | 3/1989 | European Pat. Off. | G06F 11/00 |
| 8300759 | 3/1983 | WIPO | G06F 11/28 |

OTHER PUBLICATIONS

Search Report of Oct. 7, 1994.

Primary Examiner—David K. Moore
Assistant Examiner—Tariq Rafiq Hafiz
Attorney, Agent, or Firm—Blakely, Sokoloff, Taylor & Zafman

[57] ABSTRACT

A microprocessor is disclosed herein with an idle mode of operation. The microprocessor provides a very quick interrupt that can be asserted externally. A Run/Stop (R/S) pin on the chip is asserted to access and hold the idle mode. The R/S pin is electrically connected to a central control unit. An additional pin, which may be termed an "acknowledge pin", is provided to indicate when the microprocessor is in the idle state. The R/S pin and the acknowledge pin can be useful for any operation in which the microprocessor must be stopped quickly, and can be used for bus control, debugging, diagnostics, multi-processor synchronization, and direct memory access operations. The idle mode is asserted between instructions, at an instruction boundary following execution of one instruction, but before execution of the next, when the execution unit has completed all its modifications of registers, flags, and memory for a first instruction, but before it begins this modification for the next instruction following in the pipeline. In the idle mode, the decoder does not issue instructions into the pipeline, but the clock operates normally and other microprocessor functions are operable. A port may be provided, with a secondary control unit for issuing simple instructions directly to the execution unit, bypassing the normal instruction issue process. The present invention can be useful for implementing debugging and remote diagnostic systems, and also for synchronizing microprocessors running in parallel.

19 Claims, 3 Drawing Sheets

Figure 3

| STAGE ⇒ | T1 | T2 | T3 | T4 | T5 | T6 | T1* | |
|---|---|---|---|---|---|---|---|---|
| PF | $I_1$ | $I_1$ | $I_2$ | $I_2$ | $I_2$ | $I_2$ | $I_2$ | (MACROINSTRUCTION) |
| D1 | $I_0/i_{03}$ | $I_0/i_{04}$ | $I_1/i_{11}$ | $I_1/i_{12}$ | $I_1/i_{13}$ | $I_1/-$ | $I_1/i_{11}$ | (MICROINSTRUCTIONS) |
| D2 | $i_{02}$ | $i_{03}$ | $i_{04}$ | $i_{11}$ | $i_{12}$ | | | |
| EX | $i_{01}$ | $i_{02}$ | $i_{03}$ | $i_{04}$ | $i_{11}$ | | | MICROINSTRUCTION |
| WB | | $i_{01}$ | $i_{02}$ | $i_{03}$ | $i_{04}$ | | | COMPLETION |

INSTRUCTION BOUNDARY SHOWN BY BOLD LINE

MICROPROCESSOR HAVING A RUN/STOP PIN FOR ACCESSING AN IDLE MODE

This is a continuation of application Ser. No. 8/101,783, filed Aug. 3, 1993, now abandoned, which is a continuation of application Ser. No. 07/674,716 filed Apr. 27, 1992, now abandoned.

CROSS-REFERENCE TO RELATED APPLICATION

Cross-reference is made to the following commonly-assigned, copending patent application: "A MICROPROCESSOR WITH AN EXTERNAL COMMAND MODE FOR DIAGNOSIS AND DEBUGGING", by Robert S. Dreyer, et al., Ser. No. 07/874,642, filed Apr. 27, 1992.

BACKGROUND OF THE INVENTION

1. Field of the Invention

The present invention relates to microprocessors. More specifically, the present invention relates to an idle state of a microprocessor that is accessed by an external electrical pin. When the electrical pin is asserted, it accesses the idle state in which the microprocessor is powered up, but instructions are not executing. The invention is useful for hardware or software debugging, remote diagnosis, and multi-processor synchronization.

2. Description of Related Art

Conventional microprocessors operate under the control of a sequence of instructions specified by a programmer. The instructions may be in the form of macroinstructions stored in memory that are supplied to the decoder, which decodes them into a series of one or more microinstructions. Microinstructions are a series of binary numbers in a form that the execution unit can understand. The microinstructions are applied, one after the other, from the instruction decoder to the execution unit.

For faster operation, many microprocessors use "pipelining," an implementation technique in which multiple microinstructions are overlapped in execution. A pipeline includes several stages that are performed in sequence. Instructions move from stage to stage; after an instruction completes one stage and moves to the next, the following instruction moves into that stage to take its place. In this way, instructions can be fetched, decoded, and executed quickly. As an example of pipelined operation, macroinstructions are decoded into microinstructions, which are applied one after the other to the execution unit or a "datapath", which executes the microinstructions to perform the operations specified therein. The execution unit may include a number of general purpose registers, an arithmetic unit (ALU), control registers, and some control logic. Instruction flow through a pipeline is controlled by a central control unit.

When a problem develops during execution of a program that may be the result of a hardware malfunction or software error, for example if the microprocessor simply stops, or if it begins outputting meaningless data, locating the cause of the problem may be extremely difficult. Typically when an error is encountered, a software debugger is sufficient. When a hardware malfunction is encountered, a lower level mechanism is needed, such as an in-circuit emulator or other hardware debugger.

When the microprocessor is a component of a computer installed at a remote location, expert diagnosis can be particularly difficult after the customer telephones with a complaint. If the system has shut down, or "crashed", direct keyboard control may be impossible. Even if the keyboard were usable, the expert who is analyzing the problem may be physically located elsewhere. In this instance, an expensive service call will usually be necessary. It would be an advantage to provide a microprocessor that can be diagnosed from a remote location:.

Particularly, to assist in ascertaining the cause of a problem, it would be an advantage to provide a microprocessor that can be stopped externally, without software intervention or control, so that the microprocessor can be analyzed to determine the cause of the problem.

Problems can also occur when a program is first being developed by an applications programmer. In order to assist the applications programmer in his development efforts, debugging tools have been developed. The debugging tools may be built into the hardware of a computer, or they may include a software-hardware combination. One debugging technique involves setting breakpoints at some position in the program's code. When encountered during program operation, breakpoints may halt program operation at the next convenient location and shift the program's operation into a debug mode. Because the normal flow of program operation is disrupted by a breakpoint, it may be treated as an interrupt.

When an interrupt occurs, whether it be caused from a breakpoint or any other type of interrupt, it is conventional that the contents of the instruction pointer are pushed onto the stack, and also that the contents of one or more of the registers are saved. This information, the instruction pointer, as well as the contents of certain registers and flags are saved for several reasons. For one reason, the processor state may include information essential to successful operation of the called routine such as the instruction pointer, flags; and condition codes. For another reason, saving this information is useful so that when the interrupt has finished its operation, program operation can resume at the place where the interrupt occurred. Saving this information takes time, and slows the interrupt process. Furthermore, the simple act of saving registers or reading instructions for a service routine may interfere with diagnosis efforts, particularly in the context of cache consistency problems.

In order to halt operation of a microprocessor according to prior methods, a "hold" pin may be asserted. The hold pin prevents the microprocessor from taking over the memory bus between the cache and main memory. The hold pin is particularly useful for DMA (direct memory access) operations. However, when the hold pin is asserted, the microprocessor continues operations until it requires use of the memory bus, and only then will it cease operations. Therefore it is uncertain at what place, and when, the microprocessor will stop. If the microprocessor has an on-board cache, a feature common in microprocessors, the uncertainty is increased. A cache stores commonly used instructions and data. In a microprocessor with a cache, operations may proceed for quite a long time using the cache instructions and data without the necessity for accessing main memory. In that instance, microprocessor operation may not stop until a very long time after the hold pin has been asserted.

SUMMARY OF THE INVENTION

The present invention provides a microprocessor with an idle mode of operation, or "idle state" which exists on a boundary between instructions. In the idle state, the decoder does not decode further instructions beyond the boundary.

However, many other microprocessor functions remain operable. The present invention can be useful for implementing debugging and remote diagnostic systems, and also for synchronizing microprocessors running in parallel.

The microprocessor described herein includes an electrical pin, termed a "Run/Stop pin", or a "R/S pin", that is positioned on the microprocessor chip in order to receive an electrical signal. The microprocessor includes a pipeline including an instruction decoder and an execution unit, and a central control unit that includes an interrupt prioritizer and a pipeline sequencer. The central control unit monitors and controls the instruction decoder, and, utilizing its pipeline sequencer, monitors and controls the flow of instructions through the pipeline. The R/S pin is electrically connected to the central control unit. Specifically, the R/S pin is connected to the interrupt prioritizer. An additional pin, which may be termed an "acknowledge pin", is provided to indicate when the microprocessor is in the idle state. Furthermore, additional circuitry may be connected to the execution unit and the control unit of the microprocessor to provide instructions and control information directly thereto while bypassing the instruction pointer update that is typically done as part of decoding and issuing an instruction.

According to the method of the present invention, the R/S pin is asserted to access the idle mode. While the R/S pin is asserted, the microprocessor remains in the idle mode. When the R/S pin is deasserted, instruction execution resumes where it left off.

When the idle mode is asserted, a high priority interrupt is noted in the interrupt prioritizer. As a result, the decoder halts operation following completion of the currently executing macroinstruction and "backs up" to the start of the macroinstruction following in the pipeline, thereby halting the microprocessor on macroinstruction boundary. Backing up is necessary due to the pipeline nature of the microprocessor, in which early stages of the pipeline begin execution before the previous macroinstruction has completed execution. After operation has been halted, the microprocessor is in the idle mode, and the acknowledge pin indicates that it is in this mode. In the preferred embodiment, halting the instruction decoder is accomplished by the pipeline sequencer, which does not permit control of the pipeline between the decoder and the execution unit to pass to the decoder, thereby preventing the decoder from supplying further instructions.

An "macroinstruction boundary" is viewed from the standpoint of the execution unit. A macroinstruction boundary may be defined as the point between macroinstructions, when the execution unit has completed all its modifications of registers, flags, and memory for a first instruction, but before it begins modification of the registers, flags, and memory for the next macroinstruction following in the pipeline.

At an macroinstruction boundary in the idle mode, the decoder cannot issue further microinstructions to the execution unit while the R/S pin remains asserted, but the clock operates normally, and other microprocessor functions are operable. The control is external; the pin cannot be overridden except by deasserting the R/S pin.

The microprocessor may include additional circuitry, such as a secondary control unit for issuing simple macroinstructions. In the idle mode, this secondary control unit can be used to provide microinstructions directly to the execution unit, bypassing the decoder. Furthermore, a serial port may be provided, connected to the secondary control unit, to input commands and other information while the microprocessor is in the idle mode.

The present invention provides a number of advantages including a very quick interrupt, and external access to that interrupt. The present invention has application in any operation in which the microprocessor must be stopped. The present invention has advantages for bus control, debugging, diagnostics, multiprocessor synchronization, and direct memory access operations.

BRIEF DESCRIPTION OF THE DRAWINGS

FIG. 3 is a diagram of a series of instructions in a pipeline, to illustrate pipeline operation and an instruction boundary.

DETAILED DESCRIPTION OF THE PREFERRED EMBODIMENT

The invention is best understood by reference to the figures wherein like parts are designated with like numerals throughout.

The present invention is implemented in the Intel Architecture Microprocessor family, and therefore is described in terms of that particular architecture. However, the present invention may be implemented in other microprocessor architectures, and therefore the present invention is not limited to the described embodiment.

Figure 1:
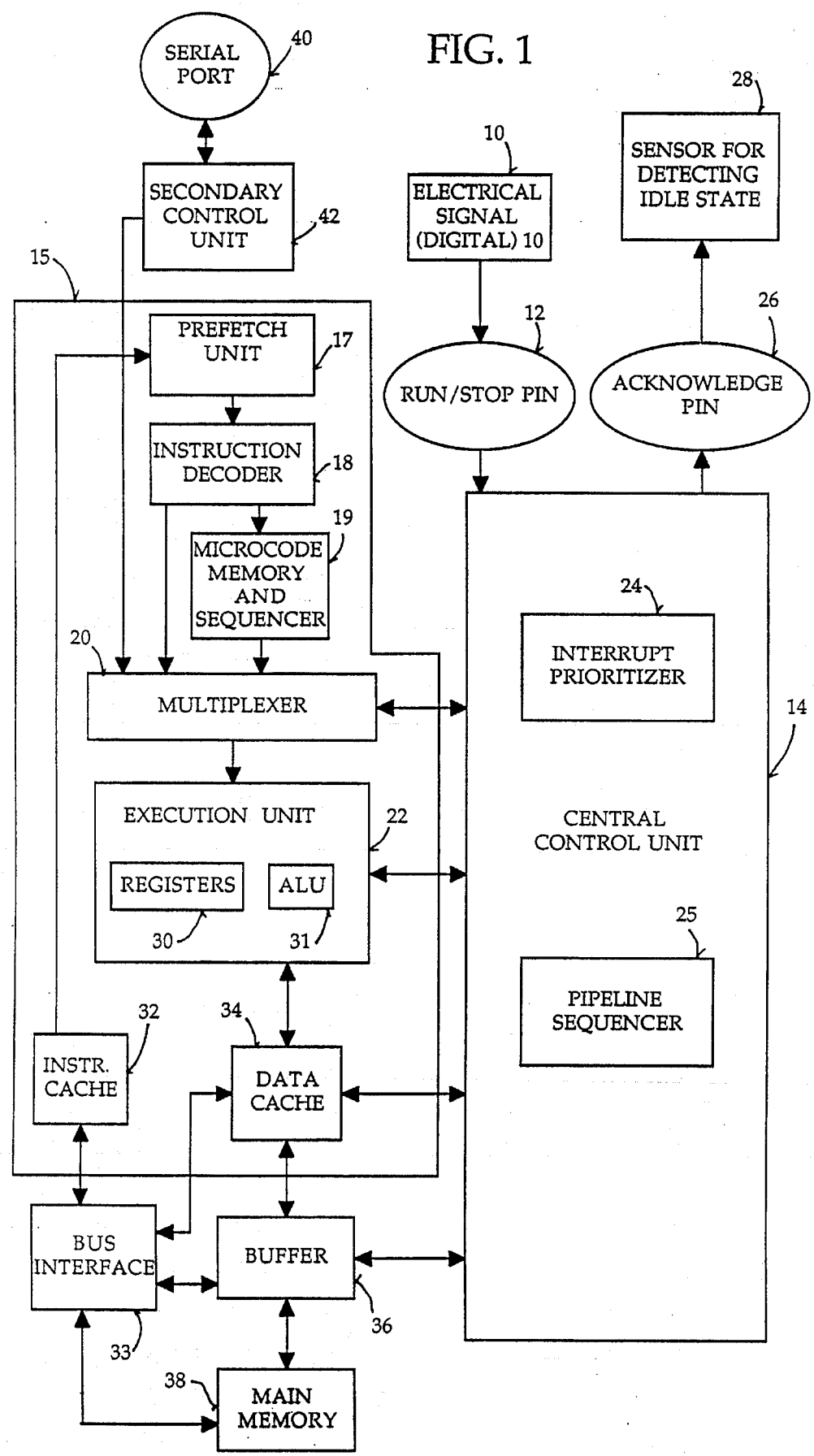
FIG. 1 is block diagram of a microprocessor incorporating the present invention.

Referring to FIG. 1, an electrical signal 10, in digital form is supplied to a Run/Stop (R/S) pin 12. The R/S pin 12 is provided on the outside of a standard microprocessor chip where it has the form of a conventional electrical pin.

A central control unit 14 is provided to perform a variety of functions common to conventional computers. A pipeline 15 is controlled by the central control unit 14. The pipeline 15 may include any of a number of conventional configurations, for example the Intel i486™ microprocessor, which is widely available, includes an exemplary pipeline.

The pipeline 15 of the preferred embodiment includes a prefetch unit 17 for buffering macroinstructions between their memory location and an instruction decoder 18, a microcode memory and sequencer 19 that stores microcode accessed by the decoder 18 for decoding a complex macroinstruction into a sequence of microinstructions, and a multiplexer 20 for selecting between the decoder 18 and the microcode memory and sequencer 19. The output of the multiplexer 20 is supplied to an execution unit 22.

The central control unit 14 includes an interrupt prioritizer 24. The R/S pin 12 is connected to the interrupt prioritizer 24, which may include flags that signify whether or not an interrupt has been requested. Within the interrupt prioritizer 24, the R/S pin 12 requests a very high level interrupt, which has the effect of stopping the pipeline 15 at an macroinstruction boundary; i.e., after execution of the currently executing macroinstruction is complete and the processor state (e.g. registers) have been updated. In the preferred embodiment, the central control unit 14 includes a pipeline sequencer 25 which controls the flow of instructions through the pipeline 15. In order to halt the pipeline 15 at an macroinstruction boundary, the pipeline sequencer 25 allows the execution stage to be completed and the processor state to be updated for a first macroinstruction. However, the next macroinstruction following in the pipeline is backed up so that the following macroinstruction is not completely executed, and the decoder 18 stands ready to reissue that macroinstruction. In effect, the pipeline sequencer 25 of the central control unit 14 controls the pipeline 15 so that no further microinstructions are provided to the execution unit 22. The pipeline and the macroinstruction boundaries are more fully explained below with reference to FIG. 3. In other embodiments, different methods of halting operation of the instruction decoder 18 may be employed. For example, control circuitry may be provided which directly halts operation of the instruction decoder 18, or prevents the next instruction from being delivered to the decoder 18.

The pipeline 15 and the central control unit 14 communicate by exchanging signals. The central control unit 14 is aware when execution is complete (an instruction boundary has passed the execution stage) and the pipeline 15 has stopped. When this stop condition is detected, the microprocessor is in the idle state. Then, the central control unit 14 sends a signal to an acknowledge pin 26 provided on the outside external surface of the microprocessor. This acknowledge pin 26 may be connected to any suitable detector such as a sensor 28 for detecting the idle state.

The execution unit 22 includes a number of registers 30 which include general purpose registers, control registers and other registers as appropriate for the particular microprocessor. The execution unit 22 also includes an arithmetic logic unit (ALU) 31 for performing arithmetic operations. During typical processing, the execution unit 22 is supplied with a series of microinstructions from the decoder 18 for simple macroinstructions, or, if the macroinstruction is more complex, from the microcode memory and sequencer 19. For example, if an instruction to be decoded by the decoder 18 is complex, then the microcode memory and sequencer 19 is invoked to supply a sequence of microinstructions that are sent, one after the other, to the execution unit 22 for execution.

The pipeline 15 obtains macroinstructions and data from memory in any conventional manner. An instruction cache 32 is provided to supply instructions to the prefetch unit 17. The instruction cache 32 is connected to a bus interface unit 33 which is also connected to a data cache 34, a buffer 36, and a main memory 38. Control of the instruction cache 32, the bus interface unit 33, the data cache 34 and the buffer 36 is provided by the central control unit 14.

A serial port 40 may be included in order to pass information from an external source into the microprocessor while it is in the idle state. The serial port 40 can operate while the instruction decoder 18 is not operating, and therefore the serial port 40 has circuitry for performing communication functions independent from the remainder of the microprocessor. A secondary control unit 42 may be connected to the serial port 40 to provide additional functions, such as receiving and storing data and instructions which may be sent over the serial port 40. The secondary control unit 42 may include some control logic, and several registers for storing instructions or data or other useful information. In some embodiments, the circuits of secondary control unit 42 may be incorporated into the circuits of the serial port 40.

The secondary control unit 42 is coupled to the execution unit 22 through the multiplexer 20. The secondary control unit 42 is also connected to the central control unit 14 to supply control logic and protocol information. The secondary control unit 42, together with the serial port 40, may be useful for allowing external control during debugging and diagnosis of errors or malfunctions.

Figure 2:
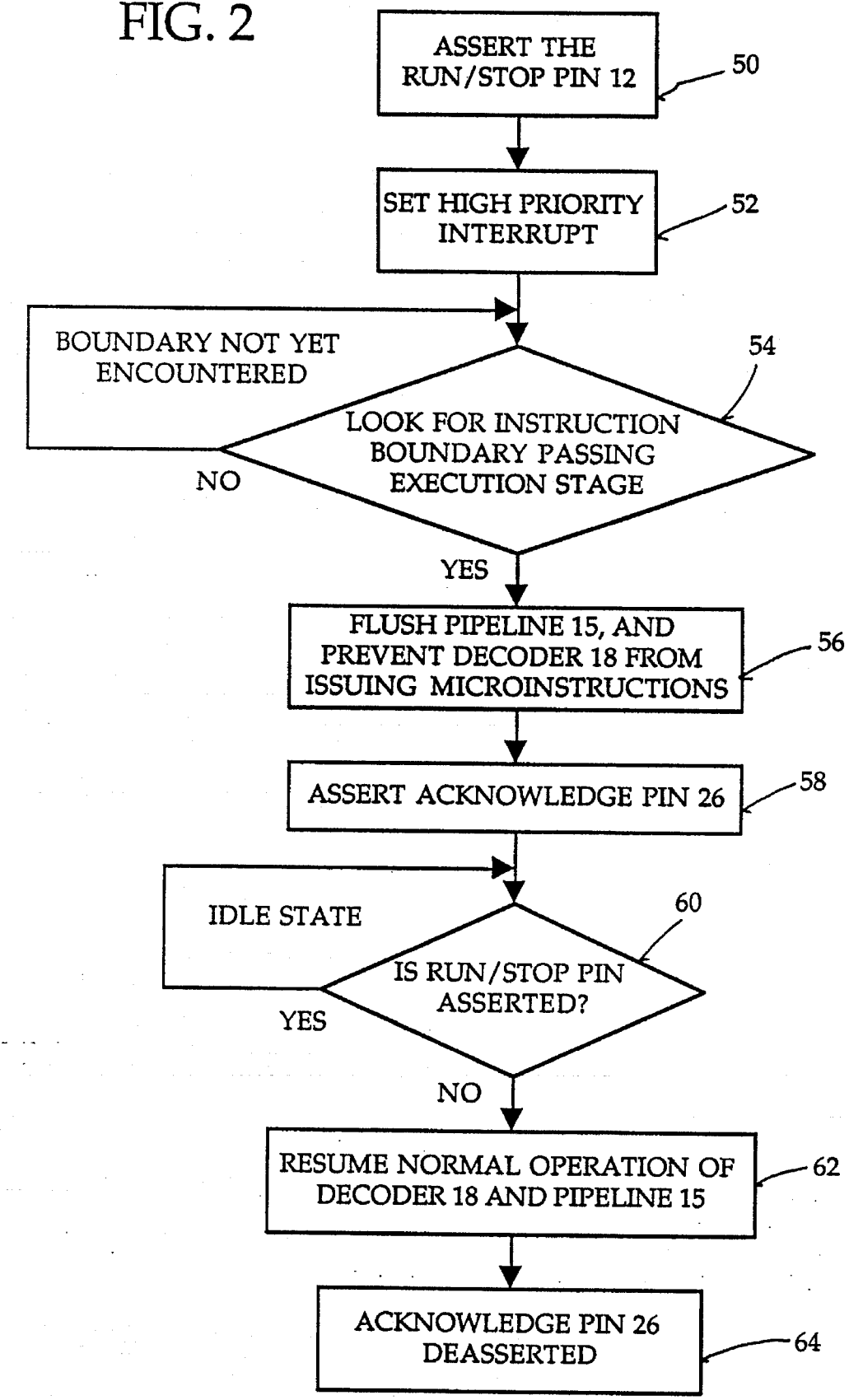
FIG. 2 is a flowchart illustrating a method of operation of a microprocessor constructed in accordance with the present invention.

Reference is now made to FIG. 2, which is a flowchart illustrating operation of the R/S pin 12 to access the idle state. In a box 50, the R/S pin 12 is asserted by any conventional means. For example, if the R/S pin 12 is active low, then the electrical signal 10 is driven low. As a result, the interrupt is set to a high priority, as illustrated in a box 52. Then as illustrated in a decision block 54, the microprocessor waits for the next instruction boundary to pass the execution stage. Instruction boundaries and the execution stage are described more fully with reference to FIG. 3. When the boundary is encountered, the decoder 18 is prevented from issuing further microinstructions as illustrated in a box 56. An effect of preventing issuance of microinstructions is to prevent the instruction pointer from being altered or updated. When execution of the decoder 18 has been halted, the acknowledge pin 26 is asserted as illustrated in a box 58 to inform a sensor 28, or any other sensing means, that the microprocessor is in the idle state and the microprocessor is not executing instructions. As illustrated in a decision box 60, the microprocessor will remain in the idle state until the R/S pin 12 has been deasserted. When this occurs, normal operation of the decoder 18 and the remainder of the pipeline 15 is resumed as illustrated in a box 62, and the acknowledge pin 26 is deasserted as illustrated in a box 64.

Reference is made to FIG. 3 which is a diagram illustrating pipeline operation and the instruction boundary as implemented in the preferred embodiment of the present invention. The stages of the pipeline are denoted by the entries along the left hand column of the table of FIG. 3. The time intervals between instruction steps are illustrated by the horizontal numbers T1, T2, and so on. The first stage in the pipeline is the "PF" stage, or the prefetch stage performed by the prefetch unit 17. In this stage, a macroinstruction denoted by the uppercase "I", is obtained from cache or other memory and buffered to the decode unit 18. The stage "D1" includes instruction decoding performed within the decoder 18 and a microinstruction memory and sequencer 19 in the preferred embodiment. Issued microinstructions are denoted by a lowercase "i". In the "D2" stage, address generation processing—segmentation and paging operations—are performed on the microinstruction. The "EX" stage includes all execution required by the microinstruction. Following the EX stage, the last stage is the "WB" or "writeback" stage. In this stage, data that is either computed in the execute stage or read from memory is written into the register file and flags are updated.

For purposes of illustration; beginning at the time T1, the prefetch (PF) unit has tile macroinstruction $I_1$ in its buffer. The macroinstruction $I_0$ has been provided to the D1 stage. In response, the D1 unit has issued a series of microinstructions, including the microinstructions $i_{01}$, $i_{02}$, and $i_{03}$. The microinstruction $i_{01}$ has proceeded through the stages to the EX stage, the microinstruction $i_{02}$ has proceeded through the pipeline to the D2 stage, and the microinstruction $i_{03}$ will be issued by the stage D1 and the next time T2. At the time interval T2, the D1 stage still must issue another microinstruction $i_{04}$, the microinstruction $i_{03}$ has proceeded to stage D2, and the microinstruction $i_{02}$ is in the EX stage. The microinstruction $i_{01}$ has completed execution, the processor state has been updated, and it is now in the WB stage. In this example, the last microinstruction issued from the macroinstruction $I_0$ is $i_{04}$. Therefore at the next time interval T3, the next macroinstruction $I_1$ moves into the D1 stage and its first microinstruction $i_{11}$ is issued. An instruction boundary is defined between this microinstruction $i_{11}$ and the last microinstruction $i_{04}$ of the preceding macroinstruction $I_0$. The instruction boundary is continued to be defined through the following time intervals T4 and T5 of the pipeline 15.

Moving to the time interval T5, the last issued microinstruction, $i_{04}$, from the macroinstruction $I_0$ has completed the execution stage and it is now in the WB stage. Before the microinstruction $i_{11}$ has had the opportunity to move into the WB stage, the idle mode may be implemented in the next time interval T6. The idle mode may be accessed as described elsewhere in the specification. Within the probe mode at the time interval T6, the stages D2, EX, and WB can be accessed by another means, such as the secondary control unit 42 described with reference to FIG. 1. Within the idle mode, the stage D1 has been backed up so that the first microinstruction to be issued after the probe mode is deasserted, is the first microinstruction, $i_{11}$, for the macroinstruction $I_1$. Throughout the existence of the idle mode, the stage D1 does not move ahead or otherwise change, and therefore the instruction pointer and other processor state information is not updated unless specifically instructed to do so by instructions flowing through the secondary control unit 42.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing descriptions. All changes which come within the meaning and range of equivalency of the claims are to be embraced within their scope.

What is claimed is:

1. A method of operating a microprocessor having an external R/S pin, an execution unit, and a decoder and microcode sequencer coupled to said execution unit, said microprocessor having a processor state associated therewith during operation, said microprocessor executing a sequence of macroinstructions, each of said macroinstructions being decoded by said execution unit and when execution is completed, then the processor state is updated responsive to the completed instruction, said method comprising:

a) asserting the R/S pin by assertion of an external signal while said microprocessor is executing a macroinstruction that has been decoded into one or more instructions;

b) continuing executing said one or more microinstructions until execution of the currently executing macroinstruction is complete and the processor state is updated responsive to said macroinstruction, and then halting execution of said microinstructions within said execution unit, thereby halting microprocessor execution at a macroinstruction boundary;

c) following said step b, flushing the execution unit of all microinstructions that are currently in the pipeline; and d) while said R/S pin remains asserted subsequent to step c, signaling the decoder and microcode sequencer so that said decoder and microcode sequencer are not allowed to issue any microinstructions to the execution unit.

2. The method of claim 1 wherein said step d further comprises controlling a pipeline sequencer so that the decoder and microcode sequencer are not allowed to issue microinstructions to the execution unit.

3. The method of claim 1 further comprising a step of asserting an acknowledge pin after execution of the decoder has been halted at the subsequent instruction boundary.

4. A method of operating a microprocessor having an external pin, an execution unit for executing instructions, and a decoder coupled to receive a sequence of macroinstructions that are decoded therein into a sequence of microinstructions which are supplied to said execution unit, said microprocessor during operation having a processor state associated therewith which is updated after execution of a macroinstruction, comprising the steps of:

a) asserting said external pin by assertion of an external signal while said microprocessor is executing a macroinstruction that has been decoded into one or more microinstructions;

b) executing one or more microinstructions until all microinstructions decoded from said currently executing macroinstruction have completed execution and said processor state has been updated responsive thereto, and then halting execution of any subsequent microinstructions within said execution unit, thereby halting microprocessor execution at a macroinstruction boundary;

c) following said step b, flushing the execution unit of all microinstructions that are currently in the pipeline; and d) while said external pin remains asserted subsequent to step c, signaling the decoder to prevent issuance of any microinstructions from the decoder to the execution unit.

5. The method of claim 4 wherein said processor includes a control unit including a pipeline sequencer and said step d further comprises controlling said pipeline sequencer so that the decoder is not allowed to issue microinstructions to the execution unit.

6. The method of claim 4 further comprising a step of asserting an acknowledge pin after execution of the decoder has been halted at said subsequent instruction boundary.

7. The method of claim 4 wherein said microprocessor includes a control unit and further comprising a step, responsive to said step a, of signaling a high priority interrupt in said control unit so that said high priority interrupt initiates said steps b–d.

8. The method of claim 4 wherein said microprocessor includes a microcode sequencing unit coupled to said decoder and said execution unit, said microcode sequencing unit supplying a predetermined sequence of microinstructions responsive to said currently executing macroinstruction, and wherein:

step b includes supplying the execution unit with microinstructions from said microcode sequencing unit until completion of said predetermined microinstruction sequence associated with said currently executing macroinstruction; and step d includes signaling said microcode sequencing unit to prevent issuance of any microinstructions therefrom.

9. A method of operating a microprocessor having an external pin, an execution unit for executing instructions, and a decoder coupled to receive a sequence of macroinstructions that are decoded therein into a sequence of microinstructions which are supplied to said execution unit, said microprocessor during operation having a processor state associated therewith which is updated after execution of a macroinstruction, comprising the steps of:

a) asserting said external pin by assertion of an external signal while said microprocessor is executing a macroinstruction that has been decoded into one or more microinstructions;

b) executing one or more microinstructions until all microinstructions decoded from said currently executing macroinstruction have completed execution and said processor state has been updated responsive thereto, and then halting execution of any subsequent microinstructions within said execution unit, thereby halting microprocessor execution at a macroinstruction boundary;

c) following said step b, flushing the execution unit of all microinstructions that are currently in the pipeline;

d) while said external pin remains asserted subsequent to step c, signaling the decoder to prevent issuance of any microinstructions from the decoder to the execution unit;

e) deasserting said external pin; and f) supplying instructions from the decoder to the execution unit after said external pin is deasserted.

10. The method of claim 9 further comprising a step of deasserting the acknowledge pin responsive to deassertion of said external pin in said step e.

11. The method of claim 9 wherein said processor includes a control unit including a pipeline sequencer and step d includes controlling said pipeline sequencer so that the decoder is not allowed to supply instructions to the pipeline, and wherein said step f includes controlling the pipeline sequencer so that the decoder is allowed to supply microinstructions to the execution unit.

12. The method of claim 9 wherein said microprocessor includes a control unit and further comprising a step, responsive to said step a, of signaling a high priority interrupt in said control unit so that said high priority interrupt initiates said steps b–d.

13. The method of claim 9 wherein said microprocessor includes a microcode sequencing unit coupled to said decoder and said execution unit, said microcode sequencing unit supplying a predetermined sequence of microinstructions responsive to said currently executing macroinstruction, wherein:

step b includes supplying the execution unit with microinstructions from said microcode sequencing unit until completion of said predetermined sequence associated with said currently executing microinstruction; and step d includes signaling said microcode sequencing unit to prevent issuance of any microinstructions therefrom.

14. In a microprocessor that is executing a sequence of macroinstructions, a method for placing said microprocessor in an idle state and executing externally-provided instructions, said microprocessor including: (i) an external pin, (ii) an instruction port for receiving externally-provided instructions from a source external to the microprocessor, (iii) a decoder circuit for receiving macroinstructions in sequence and issuing at least one microinstruction in response to each macroinstruction in the sequence, and (iv) an execution unit for executing the microinstructions, the execution unit coupled to both the instruction port and the decoder circuit, the microprocessor having a processor state associated therewith during execution, the method comprising the steps of:

a) decoding macroinstructions into microinstructions and sequentially applying the microinstructions to the execution unit for execution;

b) detecting assertion of said external pin responsive to an external signal;

c) continuing to decode and execute microinstructions originating from the macroinstruction executing when the external signal is asserted in step b until the microprocessor state is next updated responsive to said currently executed macroinstruction;

d) while said external pin remains asserted subsequent to step c, signaling the decoder to prevent issuance of any microinstructions to the execution unit to place said microprocessor in an idle state; flushing the execution unit of all microinstructions when execution of the currently executing macroinstructions is complete following step c; and e) during said idle state, transferring instructions from the external source to the execution unit via the instruction port.

15. The method of claim 14 further comprising the step responsive to said step c of asserting an acknowledge signal to signify that said microprocessor has been placed in said idle state.

16. The method of claim 14 further comprising the step, responsive to deassertion of said external pin, of removing said processor from said idle state and issuing microinstructions from the decoder circuit to the execution unit for execution.

17. The method of claim 14 further comprising the steps of:

asserting an acknowledge signal upon completion of step d to signify that said processor is in said idle state; and deasserting the acknowledge signal responsive to deassertion of said external pin to remove said processor from said idle state and allow the decoder to supply microinstructions to the execution unit for execution.

18. The method of claim 14 wherein said microprocessor includes a microcode sequencing unit coupled to said decoder and said execution unit, said microcode sequencing unit supplying a predetermined sequence of microinstructions responsive to said currently executing macroinstruction, wherein:

step b includes supplying the execution unit with microinstructions from said microcode sequencing unit until completion of said predetermined sequence associated with said currently executing microinstruction; and step d includes signaling said microcode sequencing unit to prevent issuance of any microinstructions therefrom.

19. In a microprocessor that is executing a sequence of macroinstructions, a method for placing said microprocessor in an idle state and executing externally-provided instructions, said microprocessor including: (i) a run/stop pin, (ii) an instruction port for receiving externally-provided instructions from a source external to the microprocessor, (iii) a decoder circuit and microcode sequencing unit for receiving macroinstructions in sequence and issuing at least one microinstruction in response to each macroinstruction in the sequence, and (iv) an execution unit for executing the microinstructions, the execution unit coupled to both the instruction port and the decoder circuit, the microprocessor having a processor state associated therewith during execution, the method comprising the steps of:

a) decoding macroinstructions into microinstructions and sequentially applying the microinstructions to the execution unit for execution;

b) detecting assertion of the run/stop pin responsive to an external signal;

c) continuing to decode and execute microinstructions originating from the macroinstruction executing when the external signal is asserted in step b until the microprocessor state is next updated responsive to said currently executed macroinstruction, and then flushing the execution unit of all microinstructions therein;

d) while the run/stop pin remains asserted subsequent to step c, signaling the decoder and microcode sequencing unit to prevent issuance of any microinstructions to the execution unit, and then asserting an acknowledge signal to signify that said microprocessor has been placed in an idle state;

e) during said idle state, transferring instructions from the external source to the execution unit via the instruction port; and f) deasserting the run/stop pin, removing said processor from said idle state and issuing microinstructions from the decoder circuit to the execution unit for execution.

* * * * *

UNITED STATES PATENT AND TRADEMARK OFFICE
CERTIFICATE OF CORRECTION

PATENT NO.    :  5,488,728
DATED         :  January 30, 1996
INVENTOR(S)   :  Robert S. Dreyer It is certified that error appears in the above-identified patent and that said Letters Patent is hereby corrected as shown below:

In column 3 at line 54 delete "an" and insert --a--

In column 4 at line 56 delete "an" and insert --a--

In column 4 at line 62 delete "an" and insert --a--

In column 6 at line 47 delete "tile" and insert --the--

Signed and Sealed this

Fifteenth Day of July, 1997

*Attest:*

BRUCE LEHMAN

*Attesting Officer*    Commissioner of Patents and Trademarks